US011714857B2

(12) United States Patent
Li et al.

(10) Patent No.: US 11,714,857 B2
(45) Date of Patent: Aug. 1, 2023

(54) LEARNING TO SELECT VOCABULARIES FOR CATEGORICAL FEATURES

(71) Applicant: Google LLC, Mountain View, CA (US)

(72) Inventors: Cong Li, Sunnyvale, CA (US); Jay Adams, San Carlos, CA (US); Manas Joglekar, Mountain View, CA (US); Pranav Khaitan, Mountain View, CA (US); Quoc V. Le, Sunnyvale, CA (US); Mei Chen, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/076,662

(22) Filed: Dec. 7, 2022

(65) Prior Publication Data

US 2023/0146053 A1    May 11, 2023

Related U.S. Application Data

(63) Continuation of application No. 16/878,912, filed on May 20, 2020, now Pat. No. 11,537,664.
(Continued)

(51) Int. Cl.
*G06F 16/9035*   (2019.01)
*G06F 40/242*   (2020.01)
(Continued)

(52) U.S. Cl.
CPC ...... *G06F 16/9035* (2019.01); *G06F 11/3466* (2013.01); *G06F 40/242* (2020.01); *G06N 3/08* (2013.01); *G06N 20/00* (2019.01)

(58) Field of Classification Search
CPC .............. G06F 16/9035; G06F 40/242; G06F 11/3466; G06N 20/00; G06N 3/08
See application file for complete search history.

(56) References Cited

U.S. PATENT DOCUMENTS

2015/0279358 A1* 10/2015 Kingsbury .............. G10L 15/02
704/257
2016/0180214 A1    6/2016 Kanevsky et al.
(Continued)

FOREIGN PATENT DOCUMENTS

CN   105160397 A   12/2015
CN   106294313 A    1/2017
(Continued)

OTHER PUBLICATIONS

A Deep-Learned Embedding Technique for Categorical Features Encoding (Year: 2021).*
(Continued)

*Primary Examiner* — Mohammad K Islam
(74) *Attorney, Agent, or Firm* — Fish & Richardson P.C.

(57) ABSTRACT

Methods, systems, and apparatus, including computer programs encoded on a computer storage medium, for determining, for each of one or more categorical features, a respective vocabulary of categorical feature values of the categorical feature that should be active during processing of inputs by a machine learning model. In one aspect, a method comprises: generating a batch of output sequences, each output sequence in the batch specifying, for each of the categorical features, a respective vocabulary of categorical feature values of the categorical feature that should be active; for each output sequence in the batch, determining a performance metric of the machine learning model on a machine learning task after the machine learning model has been trained to perform the machine learning task with only the respective vocabulary of categorical feature values of each categorical feature specified by the output sequence being active.

20 Claims, 6 Drawing Sheets

TRAINING SYSTEM 100

Related U.S. Application Data (60) Provisional application No. 62/852,200, filed on May 23, 2019.

(51) Int. Cl.
  *G06F 11/34* (2006.01)
  *G06N 20/00* (2019.01)
  *G06N 3/08* (2023.01)

(56) References Cited

U.S. PATENT DOCUMENTS

| | | | |
|---|---|---|---|
| 2017/0011289 A1 | 1/2017 | Gao et al. | |
| 2017/0083623 A1 | 3/2017 | Habibian et al. | |
| 2020/0050941 A1* | 2/2020 | Zhuang | G06N 3/084 |
| 2022/0027756 A1* | 1/2022 | MacManus | G06N 5/04 |

FOREIGN PATENT DOCUMENTS

| | | |
|---|---|---|
| CN | 108304365 A | 7/2018 |
| CN | 108701118 A | 10/2018 |
| CN | 109284374 A | 1/2019 |
| CN | 109698030 A | 4/2019 |

OTHER PUBLICATIONS

Automatic Embedded Feature Engineering for Categorical Features (Year: 2021).*

GFEL: Generalized Feature Embedding Learning Using Weighted Instance Matching (Year: 2017).*

Bansal et al, "Ask the gru: Multi-task learning for deep text recommendations" Proceedings of the 10th ACM Conference on Recommender Systems, 2016, 8 pages.

Bender et al, "Understanding and simplifying one-shot architecture search" Proceedings of the 35th International Conference on Machine Learning 2018, 10 pages.

Brock et al, "SMASH: One-shot model architecture search through hypernetworks" International Conference on Learning Representation 2017, 21 pages.

Cai et al, "Path-level network transformation for efficient architecture search" Proceedings of the 35th International Conference on Machine Learning 2018, 10 pages.

Cai et al, "ProxylessNAS: Direct neural architecture search on target task and hardware" International Conference on Learning Representations, 2019, 13 pages.

Cheng et al, "Wide & deep learning for recommender systems" Proceedings of the 1st Workshop on Deep Learning for Recommender Systems, 2016, 4 pages.

Covington et al, "Deep neural networks for youtube recommendations" Proceedings of the 10th ACM Conference on Recommender Systems, 2016, 8 pages.

Dahouda et al., "A deep-learned embedding technique for categorical features encoding," IEEE Access, Aug. 23, 2021, 11 pages.

Donkers et al, "Sequential user-based recurrent neural network recommendations" Proceedings of the Eleventh ACM Conference on Recommender Systems, 2017, 9 pages.

Gomez-Uribe et al, "The netflix recommender system: Algorithms, business value, and innovation" ACM Trans. Manage. Inf. Syst., 2015, 19 pages.

Kim et al, "Convolutional matrix factorization for document context-aware recommendation" Proceedings of the 10th ACM Conference on Recommender Systems 2016, 8 pages.

Liu et al, "DARTS: Differentiable architecture search" International Conference on Learning Representations, 2019, 13 pages.

Liu et al, "Progressive neural architecture search" the European Conference on Computer Vision 2018, 20 pages.

Luo et al, "Neural architecture optimization" Advances in Neural Information Processing Systems, 2018, 12 pages.

Mnih et al, "Asynchronous methods for deep reinforcement learning" Proceedings of the 33rd International Conference on Machine Learning 2016, 10 pages.

Pham et al, "Efficient neural architecture search via parameter sharing" Proceedings of the 35th International Conference on Machine Learning, 2018, 10 pages.

Real et al, "Regularized evolution for image classifier architecture search" arXiv, 2018, 16 pages.

Tan et al, "Mnasnet: Platform-aware neural architecture search for mobile" arXiv, 2018, 9 pages.

Van den Oord et al, "Deep content-based music recommendation" Advances in Neural Information Processing Systems, 2013, 9 pages.

Xie et al, "SNAS: stochastic neural architecture search" International Conference on Learning Representations, 2019, 17 pages.

Zhong et al, "Practical block-wise neural network architecture generation," IEEE Conference on Computer Vision and Pattern Recognition, 2018, 11 pages.

Zhong et al, "AEFE: Automatic embedded feature engineering for categorical features," arXiv, Oct. 19, 2021, 24 pages.

Zoph et al, "Neural architecture search with reinforcement learning," International Conference on Learning Representations, 2017, 16 pages.

Zoph, "Learning transferable architectures for scalable image recognition," IEEE Conference on Computer Vision and Pattern Recognition 2018, 14 pages.

Office Action in Chinese Appln. No. 202010450032.7, dated Apr. 7, 2023, 12 pages (with English Translation).

* cited by examiner

EMBEDDING MODELS FOR A CATEGORICAL FEATURE

CATEGORICAL FEATURE VALUE EMBEDDINGS
HAVING THE SAME DIMENSIONALITY

LEARNING TO SELECT VOCABULARIES FOR CATEGORICAL FEATURES

CROSS-REFERENCE TO RELATED APPLICATION

This patent application is a continuation (and claims the benefit of priority under 35 USC 120) of U.S. patent application Ser. No. 16/878,912, filed May 20, 2020, which is a U.S. Application which claims priority under 35 U. S. C. 119 to Provisional Application No. 62/852,200, filed May 23, 2019, both which are incorporated by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that trains a machine learning model that is configured to process an input that includes categorical feature values. As used throughout this specification, a categorical feature refers to a feature that can only assume values in a discrete (e.g., finite) set of possible feature values.

According to a first aspect there is provided a method performed by one or more data processing apparatus for determining, for each of one or more categorical features, a respective vocabulary of categorical feature values of the categorical feature that should be active during processing of inputs by a machine learning model having a plurality of machine learning model parameters, the method comprising: generating, using a controller neural network having a plurality of controller parameters and in accordance with current values of the controller parameters, a batch of output sequences, each output sequence in the batch specifying, for each of the categorical features, a respective vocabulary of categorical feature values of the categorical feature that: (i) should be active during processing of inputs by the machine learning model, and (ii) is a subset of a discrete set of possible categorical feature values of the categorical feature; for each output sequence in the batch, determining a performance metric of the machine learning model on a machine learning task after the machine learning model has been trained to perform the machine learning task with only the respective vocabulary of categorical feature values of each categorical feature specified by the output sequence being active, wherein during the training: the machine learning model is configured to process an input that comprises one or more possible categorical feature values of respective categorical features by performing operations comprising: for only those possible categorical feature values included in the input that are specified as active by the output sequence, mapping the possible categorical feature value to a corresponding embedding that is iteratively adjusted during the training; and processing the embeddings to generate a machine learning model output for the input; and using the performance metrics for the output sequences in the batch to adjust the current values of the controller parameters of the controller neural network.

In some implementations, each output sequence in the batch additionally specifies a respective embedding dimensionality corresponding to each categorical feature value that is specified by the output sequence as being active during processing of inputs by the machine learning model; and for each output sequence in the batch, during the training the machine learning model is configured to map each possible categorical feature value included in the input that is specified as active by the output sequence to a corresponding embedding having the embedding dimensionality specified by the output sequence.

In some implementations, each output sequence specifies different embedding dimensionalities for different categorical feature values of a given categorical feature.

In some implementations, the machine learning model comprises a respective plurality of embedding models corresponding to each categorical feature; an embedding model corresponding to a categorical feature defines a mapping of each of one or more categorical feature values of the categorical feature to a corresponding sub-embedding of the categorical feature value having a respective dimensionality; each output sequence in the batch specifies, for each of the categorical features, one or more embedding models corresponding to the categorical feature; and mapping a given categorical feature value of a given categorical feature included in the input to a corresponding embedding comprises: for each embedding model specified by the output sequence for the given categorical feature that defines a mapping of the given categorical feature value to a corresponding sub-embedding, using the embedding model to map the given categorical feature value to the corresponding sub-embedding; and determining the embedding of the given categorical feature value based on the sub-embeddings.

In some implementations, determining the embedding of the given categorical feature value based on the sub-embeddings comprises: for any sub-embedding that has a dimensionality different than a specified dimensionality, projecting the sub-embedding to the specified dimensionality.

In some implementations, determining the embedding of the given categorical feature value based on the sub-embeddings further comprises summing or averaging the sub-embeddings.

In some implementations, processing the embeddings to generate a machine learning model output for the input comprises: for each categorical feature, generating a combined embedding corresponding to the categorical feature based on the respective embedding of each categorical feature value of the categorical feature that is included in the input and that is specified as active by the output sequence; and processing the combined embeddings using one or more neural network layers to generate the machine learning model output for the input.

In some implementations, the method further comprises: generating, using the controller neural network and in accordance with the adjusted values of the controller parameters, a new output sequence; and training the machine learning model with only the respective vocabulary of categorical feature values of each categorical feature specified by the new output sequence being active on training data to determine adjusted values of the machine learning model parameters.

In some implementations, using the performance metrics for the output sequences in the batch to adjust the current values of the controller parameters of the controller neural network comprises: training the controller neural network to generate output sequences that have increased performance metrics using a reinforcement learning technique.

In some implementations, the reinforcement learning technique is an actor critic reinforcement learning technique.

In some implementations, the performance metric for a given output sequence in the batch is based on a prediction accuracy of the machine learning model on the machine learning task with only the respective vocabulary of categorical feature values of each categorical feature specified by the output sequence being active.

In some implementations, the performance metric for a given output sequence in the batch is based on the respective embedding dimensionality corresponding to each categorical feature value that is specified by the output sequence as being active.

In some implementations, the controller neural network is a recurrent neural network that is configured to, for a given output sequence and at each of a plurality of time steps: receive as input an representation of an output generated at the preceding time step in the given output sequence, and to process the input to update a current hidden state of the recurrent neural network and to generate a score distribution over possible outputs for the time step.

In some implementations, the method further comprises: generating, in accordance with the adjusted values of the controller parameters, a final output sequence that indicates, for each of the categorical features, a respective final vocabulary of categorical feature values.

In some implementations, the method further comprises performing the machine learning task for received inputs by processing the received inputs with only the final vocabulary of categorical feature values of each categorical feature specified by the final output sequence being active.

In some implementations, the machine learning model is configured to process an input that characterizes previous search queries of a user to generate an output that characterizes a predicted next search query of the user.

In some implementations, the machine learning model is configured to process an input that characterizes previous videos watched by a user to generate an output that characterizes a predicted next video watched by the user.

In some implementations, the machine learning model is configured to process an input that characterizes previous webpages visited by a user to generate an output that characterizes a predicted next webpage visited by the user.

In some implementations, each output sequence in the batch additionally specifies an architecture of the machine learning model; and for each output sequence in the batch, the machine learning model is configured to process the input using the machine learning model architecture specified by the output sequence.

According to another aspect there is provided a method performed by one or more data processing apparatus for determining, for each of one or more categorical feature values, a respective embedding dimensionality of an embedding that should be generated for the categorical feature value during processing of inputs by a machine learning model having a plurality of machine learning model parameters, the method comprising: generating, using a controller neural network having a plurality of controller parameters and in accordance with current values of the controller parameters, a batch of output sequences, each output sequence in the batch specifying, for each categorical feature value, a respective embedding dimensionality of an embedding that should be generated for the categorical feature value during processing of inputs by the machine learning model; for each output sequence in the batch, determining a performance metric of the machine learning model on a machine learning task after the machine learning model has been trained to perform the machine learning task when the machine learning model generates embeddings of the categorical feature values with the embedding dimensionalities specified by the output sequence, wherein during the training: the machine learning model is configured to process an input that comprises one or more categorical feature values by performing operations comprising: mapping each categorical feature value included in the input to an embedding having the corresponding embedding dimensionality specified by the output sequence; and processing the embeddings to generate a machine learning model output for the input; and using the performance metrics for the output sequences in the batch to adjust the current values of the controller parameters of the controller neural network.

According to another aspect, there is provided a system comprising one or more computers and one or more storage devices storing instructions that when executed by the one or more computers cause the one or more computers to perform the operations of any of the previously described methods.

According to another aspect, there is provided one or more computer storage media storing instructions that when executed by one or more computers cause the one or more computers to perform the operations of any of the previously described methods.

Particular embodiments of the subject matter described in this specification can be implemented so as to realize one or more of the following advantages.

The training system described in this specification can train a machine learning model that is configured to process an input that includes feature values of one or more categorical features. The machine learning model is configured to maintain, for each categorical feature, a respective embedding corresponding to each feature value in a subset of the possible feature values of the categorical feature which are referred to as "active" feature values for the categorical feature. The set of active feature values for a categorical feature may also be referred to as the "vocabulary" for the categorical feature. After receiving an input, the machine learning model maps each active categorical feature value included in the input to its corresponding embedding (which is iteratively adjusted during training of the machine learning model). The machine learning model may map any "inactive" categorical feature values included in the input to a default embedding, e.g., an embedding including only zeros.

The vocabularies of categorical features, and the embedding dimensionalities of categorical feature values of the categorical features, can heavily influence the accuracy and computational resource consumption (e.g., of memory and computing power) of the machine learning model. As part of training the machine learning model, the training system described in this specification performs an automated search over a space of possible categorical feature vocabularies and embedding dimensionalities to optimize the performance of the machine learning model. The performance of the machine learning model may characterize both the prediction accuracy of the machine learning model and the computational resource consumption of the machine learning model (e.g., the number of parameters required to store the embeddings of the active categorical feature values).

Some conventional systems may learn and maintain a fixed-size embedding for each of a large number of categorical feature values. This may result in unacceptable computational resource consumption and poor performance of the machine learning model, e.g., for machine learning models that perform large-scale recommendation tasks (e.g., recommending videos or webpages to users) by processing categorical features having large numbers (e.g., millions or billions) of possible categorical feature values. In contrast, the training system described in this specification learns to select categorical feature vocabularies and embedding dimensionalities that jointly optimize the prediction accuracy and the computational resource consumption of the machine learning model. Therefore, the system described in this specification can, in some cases, increase the prediction accuracy of the machine learning model while reducing computational resource consumption by the machine learning model.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
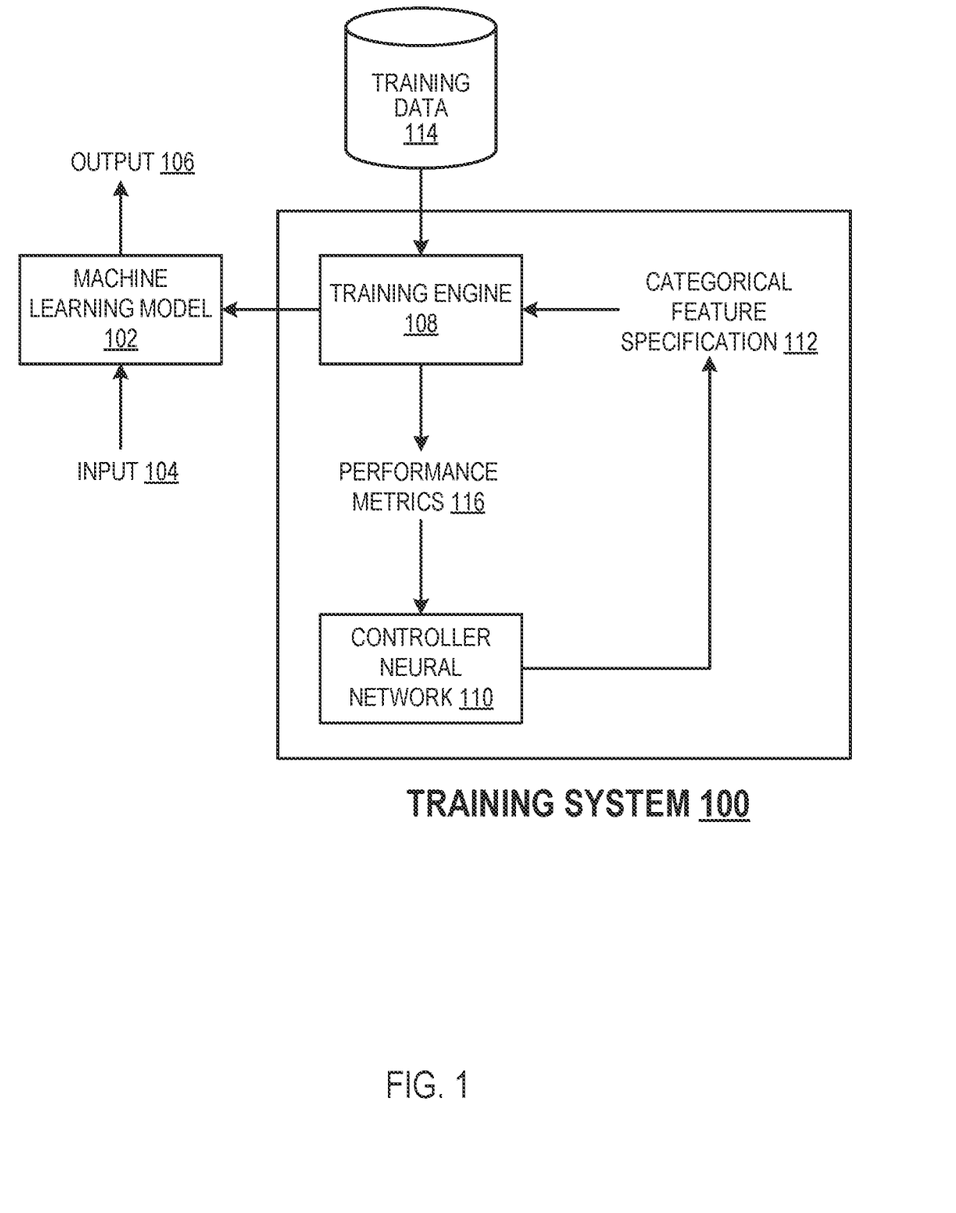
FIG. 1 shows an example training system.

FIG. 1 shows an example training system 100. The training system 100 is an example of a system implemented as computer programs on one or more computers in one or more locations in which the systems, components, and techniques described below are implemented.

The training system 100 is configured to train a machine learning model 102. The machine learning model 102 is configured to process an input 104 that includes feature values of one or more categorical features to generate a corresponding output 106. The input 104 may include zero, one, or multiple possible feature values of each categorical feature.

Generally, the machine learning model 102 can perform any of a variety of machine learning tasks. A few examples of possible machine learning tasks that may be performed by the machine learning model 102 are described in more detail next.

In one example, the machine learning model 102 may be configured to process an input that characterizes a previous textual search query of a user to generate an output that specifies a predicted next search query of the user. The categorical features in the input to the machine learning model may include, e.g.: the previous search query, uni-grams of the previous search query, bi-grams of the previous search query, and tri-grams of the previous search query. A n-gram (e.g., uni-gram, bi-gram, or tri-gram) of a search query refers to a sequence of n consecutive characters in the search query. The possible feature values of the "previous search query" categorical feature may include a predefined set of possible search queries, e.g., 1 million possible search queries, or any other appropriate number of possible search queries. The possible feature values of each "n-grams of the previous search query" categorical feature may include a predefined set of possible n-grams. The output of the machine learning model 102 may include a respective score for each search query in a set of multiple possible search queries, where the score for each search query characterizes a likelihood that it will be the next search query of the user.

In another example, the machine learning model 102 may be configured to process an input that characterizes a software application to generate an output that defines a likelihood that the software application will be selected by a user to be installed on a user device (e.g., a smartphone). The categorical features in the input to the machine learning model may include, e.g., an application identifier categorical feature, an application developer categorical feature, and an application title categorical feature. The possible feature values of the application identifier categorical feature may include a predefined set of possible application identifiers (e.g., represented as integer values), where each application identifier corresponds to a respective application. The possible feature values of the application developer categorical feature may include a predefined set of possible application developers. The possible feature values of the application title categorical feature may include a predefined set of possible n-grams.

In another example, the machine learning model 102 may be configured to process an input that characterizes previous videos watched by a user to generate an output that characterizes a predicted next video to be watched by the user (e.g., on a video-sharing platform). The categorical features in the input to the machine learning model may include a categorical feature specifying identifiers (IDs) of the previous videos watched by the user, where the possible feature values of the categorical feature include a respective ID corresponding to each of multiple videos. The output of the machine learning model 102 may include a respective score for each video in a set of multiple videos, where the score for each video characterizes a likelihood that it is the next video to be watched by the user.

In another example, the machine learning model 102 may be configured to process an input that characterizes previous webpages visited by a user to generate an output that characterizes a predicted next webpage to be visited by the user. The categorical features in the input to the machine learning model may include a categorical feature specifying IDs of previous websites visited by the user, where the possible feature values of the categorical feature include a respective ID corresponding to each of multiple webpages.

The output of the machine learning model 102 may include a respective score for each webpage in a set of multiple webpages, where the score for each webpage characterizes a likelihood that it is the next webpage to be visited by the user.

In another example, the machine learning model 102 may be configured to process an input that characterizes products associated with a user, e.g., products that were previously purchased by the user, or products that the user previously viewed on an online platform, to generate an output that characterizes other products that may be of interest to the user. The categorical features in the input to the machine learning model may include a categorical feature specifying IDs of products associated with the user, where the possible feature values of the categorical feature include a respective ID corresponding to each of multiple products. The output of the machine learning model may include a respective score for each product in a set of multiple products, where the score for each product characterizes a likelihood that the product is of interest to the user (e.g., should be recommended to the user).

In another example, the machine learning model may be configured to process an input that characterizes digital components associated with a user, e.g., digital components that were previously transmitted to the user, to generate an output that characterizes other digital components that may be of interest to the user. The categorical features in the input to the machine learning model may include a categorical feature specifying IDs of digital components that were previously transmitted to the user, where the possible feature values of the categorical feature include a respective ID corresponding to each of multiple digital components. The output of the machine learning model may include a respective score for each digital component in a set of multiple digital components, where the score for each digital component characterizes a likelihood that the digital component is of interest to the user (e.g., such that the digital component should be transmitted to the user).

As used throughout this specification, the phrase digital components refers to discrete units of digital content or digital information that can include one or more of, e.g., video clips, audio clips, multimedia clips, images, text segments, or uniform resource locators (URLs). A digital component can be electronically stored in a physical memory device as a single file or in a collection of files, and digital components can take the form of video files, audio files, multimedia files, image files, or text files and include streaming video, streaming audio, social network posts, blog posts, and/or advertising information, such that an advertisement is a type of digital component. Generally, a digital component is defined by (or provided by) a single provider or source (e.g., an advertiser, publisher, or other content provider), but a digital component provided from one source could be enhanced with data from another source (e.g., weather information, real time event information, or other information obtained from another source).

The machine learning model 102 includes an embedding system and a prediction system, each of which will be described in more detail next.

The embedding system is configured maintain, for each categorical feature, a respective embedding corresponding to each feature value in a subset of the possible feature values of the categorical feature which are referred to as "active" feature values for the categorical feature. The set of active feature values for a categorical feature may also be referred to as the "vocabulary" for the categorical feature. The vocabulary for a given categorical feature may be empty (i.e., such that none of the possible feature values are active), a proper subset of the set of possible feature values, or equal to the set of possible feature values (i.e., such that every possible feature value is active). As used throughout this specification, an "embedding" refers to an ordered collection of numerical values, e.g., a vector or matrix of numerical values. The embedding system maps each active categorical feature value included in the input 104 to its corresponding embedding, and provides the embeddings to the prediction system.

The embedding system may map any categorical feature value included in the input that is "inactive", i.e., that is not an active feature value for the categorical feature, i.e., that is outside the vocabulary of the categorical feature, to a default (i.e., predefined) embedding, e.g., an embedding including only zeros.

The prediction system is configured to process the embeddings of the categorical feature values included in the input 104 in accordance with values of a set of prediction system parameters to generate the output 106. For example, to generate the output 106, the prediction system may determine a combined embedding corresponding to each categorical feature by combining (e.g., summing or averaging) the respective embeddings for each active feature value of the categorical feature that is included in the input 104. The prediction system may then process the combined embeddings corresponding to the categorical features to generate the output 106, e.g., by concatenating the combined embeddings corresponding to the categorical features and processing the result of the concatenation using one or more neural network layers. The neural network layers may be, e.g., fully-connected neural network layers, convolutional neural network layers, or any other appropriate type of neural network layers.

The choice of the vocabulary for each categorical feature, as well as the dimensionality of the embedding used by the machine learning model for each feature value in the vocabulary of each categorical feature, may significantly influence the performance of the machine learning model 102. More specifically, the choice of categorical feature vocabulary and embedding dimensionality may significantly influence the prediction accuracy and the computational resource consumption of the machine learning model.

For example, some categorical features may have a large number of possible feature values, e.g., a categorical feature that specifies IDs of previous videos watched by a user may have millions of possible feature values (e.g., corresponding to millions of videos uploaded to a video-sharing platform). Learning and maintaining an embedding for each possible categorical feature value may be computationally intensive and result in overfitting. Moreover, using embeddings that have the same dimensionality for each feature value of a categorical feature may result in inefficient computational resource usage. For example, more common or predictive feature values may require larger embeddings to represent their complex relationships with other feature values, while using larger embeddings for less common feature values may result in overfitting due to the rarity of those feature values in the training data.

As part of training the machine learning model 102, the training system 100 performs an automated search over a space of possible categorical feature vocabularies and embedding dimensionalities to optimize the performance of the machine learning model 102, as will be described in more detail below.

The training system 100 includes a training engine 108 and a controller neural network 110, which will each be described in more detail next.

At each of one or more iterations, which are referred to herein as "optimization iterations", the training engine 108 obtains a categorical feature specification 112 that is generated by the controller neural network 110 at the optimization iteration. The categorical feature specification 112 defines, for each categorical feature: (i) a vocabulary of the categorical feature, and (ii) a respective dimensionality of the embedding to be used by the machine learning model for each feature value in the vocabulary of the categorical feature. The categorical feature specification may be represented, e.g., as a sequence of numerical values. For each categorical feature, the categorical feature specification may specify different embedding dimensionalities for different feature values in the vocabulary of the categorical feature, such that certain feature values have a higher embedding dimensionality than others.

The training system 100 then obtains a set of categorical feature value embeddings that conform to the categorical feature specification 112. That is, the training system 100 obtains a respective embedding for each feature value in the vocabulary of each categorical feature, where the vocabulary of the categorical features and the dimensionalities of the embeddings are specified by the categorical feature specification 112. The training system 100 may obtain categorical feature value embeddings that have been trained at previous optimization iterations (e.g., rather than being randomly initialized), as will be described in more detail below.

The training system 100 provides the categorical feature value embeddings (i.e., which conform to the categorical feature specification 112) to the machine learning model 102, and uses a training engine 108 to train the machine learning model 102 on a set of training data 114. The training data includes a set of training examples, where each training example specifies: (i) a training input to the machine learning model, and (ii) a target output that should be generated by the machine learning model by processing the training input.

The training engine 108 may train the machine learning model 102 on the training data 114 using multiple iterations of stochastic gradient descent to optimize an objective function, e.g., that measures the prediction accuracy of the machine learning model 102, e.g., a cross-entropy objective function. At each iteration of stochastic gradient descent, the training engine 108 may backpropagate gradients of the objective function through the machine learning model to adjust the embeddings of the active feature values of each categorical feature.

After determining that a training termination criterion is satisfied (e.g., because a predetermined number of training iterations have been performed), the training system 100 determines a performance metric 116 corresponding to the current categorical feature specification 112. The performance metric 116 may depend on both: (i) the prediction accuracy of the trained machine learning model, and (ii) the number of parameters required to represent the categorical feature value embeddings (i.e., when the current categorical feature specification 112 is used).

The training system 100 may determine the prediction accuracy of the trained machine learning model, e.g., by evaluating the prediction accuracy of the trained machine learning model on a set of validation data. The validation data may include training examples that are not used during training of the machine learning model 102, i.e., that are not included in the training data 114. The training system 100 may evaluate the prediction accuracy of the trained machine learning model on the validation data using any appropriate objective function, e.g., a cross-entropy objective function.

The training system 100 may determine the number of parameters C required to represent the categorical feature value embeddings as:

$$C = \sum_{F \in \mathcal{F}} \sum_{v \sim F} d_{v,f} \qquad (1)$$

where F indexes the categorical features, $\mathcal{F}$ is the set of categorical features, v indexes the feature values in the vocabulary of categorical feature F, and $d_{v,F}$ denotes the dimensionality of the embedding of the feature value v in the vocabulary of categorical feature F (i.e., under the current categorical feature specification 112).

The training system 100 may determine the performance metric P, e.g., as:

$$P = -\mathcal{L}_{pred} + \beta \cdot \max\left(\frac{C}{C_{tot}} - 1, 0\right) \qquad (2)$$

where $\mathcal{L}_{pred}$ denotes the prediction accuracy, β denotes a constant value, C denotes the number of parameters required to represent the categorical feature value embeddings, and $C_{tot}$ denotes a "budget" for the number of parameters used to represent the categorical feature representations. It can be appreciated that C affects the performance metric P only if it exceeds its "budget" $C_{tot}$, thereby encouraging the number of parameters C required to represent the categorical feature value embeddings to remain within the budget $C_{tot}$.

The controller neural network 110 is configured to generate a categorical feature specification 112 at each optimization iteration. The controller neural network 110 may have any appropriate neural network architecture that enables it to generate categorical feature specifications.

For example, the controller neural network may be a recurrent neural network, i.e., a neural network with one or more recurrent neural network layers, e.g., long short-term memory (LSTM) recurrent neural network layers. In this example, the controller neural network may generate a sequence of output values by generating a respective output value at each of multiple time steps, where the sequence of output values collectively define the categorical feature specification. In particular, at each time step, the controller neural network may process a representation of an output generated at the preceding time step to generate a score distribution over possible outputs for the time step and to update the current hidden state (e.g., cell state) of the controller neural network. The score distribution over possible outputs for the time step may include a respective score (numerical value) for each output in a set of possible outputs for the time step. The controller neural network may determine the output for the time step by processing the score distribution over possible outputs to generate a probability distribution over possible outputs, and then sampling a possible output in accordance with the probability distribution. The controller neural network may generate the probability distribution over possible outputs, e.g., by processing the score distribution over possible outputs using a soft-max function.

The training system 100 adjusts the parameter values of the controller neural network 110 at each optimization iteration to encourage the controller neural network 110 to generate categorical feature specifications 112 having superior (e.g., higher) performance metrics. For example, the training system 100 may train the controller neural network 110 using reinforcement learning techniques to maximize a cumulative measure of rewards (e.g., a discounted sum of rewards), where the reward received at each optimization iteration is specified by the performance metric 116 for the optimization iteration. The training system 100 may train the controller neural network 110 using any appropriate reinforcement learning technique, e.g., an actor-critic reinforcement learning technique.

In some implementations, the controller neural network 110 may generate a batch of multiple output sequences at each optimization iteration, i.e., that define multiple categorical feature specifications. In this implementations, the training system 100 may determine a respective performance metric 116 for each categorical feature specification, and may determine the reward at the optimization iteration, e.g., based on the average of the performance metrics 116 for the optimization iteration.

In some implementations, the controller neural network 110 may be configured to generate an output that defines both: (i) a categorical feature specification, and (ii) an architecture of the machine learning model. The data defining the architecture of the machine learning model may specify, e.g., the number of neural network layers used by the prediction system of the machine learning model to process the embeddings of the active categorical feature values to generate an output. In these implementations, the training system 100 may determine the performance metric for the categorical feature specification specified by the controller neural network using a machine learning model having the architecture specified by the controller neural network.

After a final optimization iteration, the training system 100 may identify the "best" categorical feature specification 112, e.g., having the highest performance metric 116 from among the categorical feature specifications that were generated at each optimization iteration. Thereafter, the machine learning model 102 may perform the machine learning task using the categorical feature vocabularies and feature value embedding dimensionalities specified by the best categorical feature specification 112. In some implementations, the training system 100 may also identify the "best" architecture of the machine learning model, e.g., that was generated by the controller neural network along with the best categorical feature specification, and thereafter implement the machine learning model using the best architecture.

To facilitate faster training of the machine learning model at each optimization iteration, the training system 100 may avoid retraining the categorical feature value embeddings from scratch (e.g., from default values, or from randomly initialized values) each time the machine learning model is trained. Rather, for each categorical feature, the training system 100 may maintain a set of shared parameters that are maintained across optimization iterations. Each time the machine learning model is trained, the embeddings of the categorical feature values provided to the machine learning model are a subset of the shared parameters corresponding to the categorical feature, and training the machine learning model updates this subset of the shared parameters.

For example, for each categorical feature, the set of shared parameters corresponding to the categorical feature may be represented as a two-dimensional (2-D) array of numerical values. The number of rows in the array may be equal to the number of possible feature values of the categorical feature, and the number of columns may be equal to the maximum allowable embedding dimensionality for possible values of the categorical feature.

Figure 2:
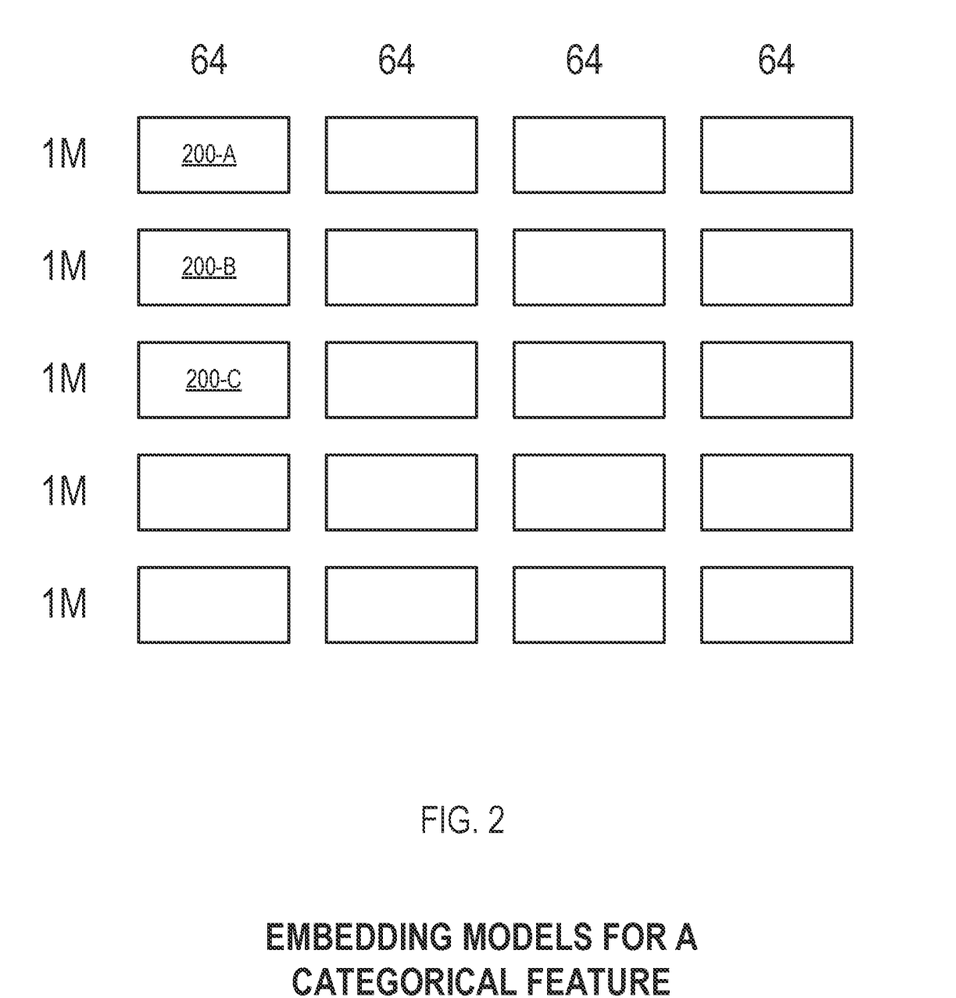
FIG. 2 shows an array of shared parameter values for a categorical feature being partitioned into a grid of embedding models.

The array of shared parameters may be understood as being partitioned into a grid of sub-arrays, as illustrated by FIG. 2, where each sub-array is referred to as an "embedding model". Each embedding model is illustrated by a box, e.g., 200-A-C. In this example, the overall array has 5 million rows and 256 columns, and each embedding model has 1 million rows and 64 columns. Each embedding model defines a mapping from each of the feature values associated with the rows of the array corresponding to the embedding model to a corresponding "sub-embedding" having a dimensionality equal to the number of columns of the embedding model. (A "sub-embedding" refers to an ordered collection of numerical values, e.g., a vector or matrix of numerical values). For example, the embedding model 200-A defines a mapping from the feature values associated with the first 1 million rows of the array to corresponding 64-dimensional sub-embeddings.

A categorical feature specification may specify the vocabulary for a categorical feature, and the respective embedding dimensionality for each feature value in the vocabulary, by specifying a subset of the embedding models for the categorical feature (i.e., a subset of the sub-arrays of the overall array). For each feature value of the categorical feature, the set of sub-embeddings of the feature value that are defined by the embedding models which are specified by the categorical feature specification may collectively define the embedding of the feature value. If none of the embedding models that are specified by the categorical feature specification define a sub-embedding for a particular feature value, then that feature value is considered to be outside the vocabulary of the categorical feature.

Figure 3:
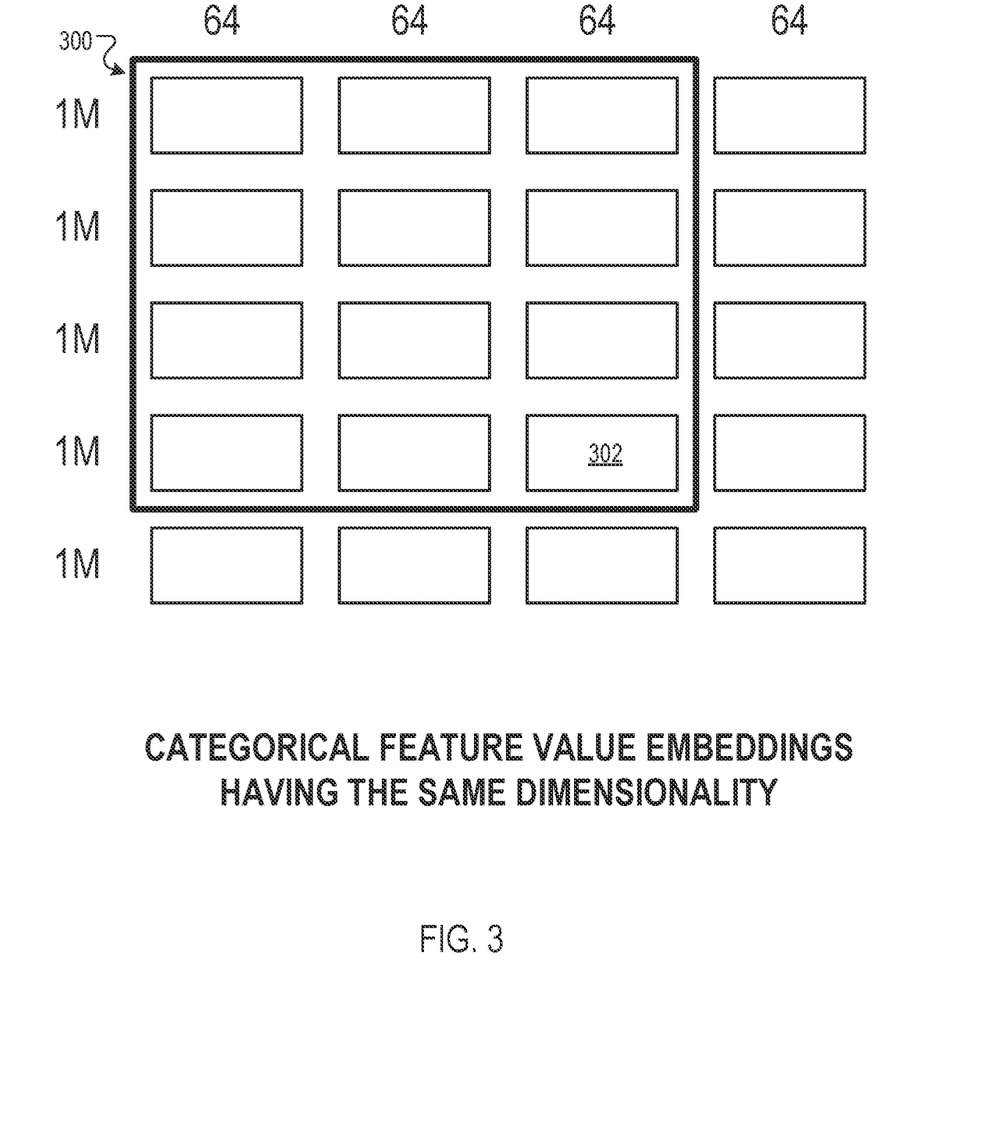
FIG. 3 shows a set of embedding models for a categorical feature that define embeddings having the same dimensionality for each active feature value of the categorical feature.

In some implementations, for each categorical feature, the categorical feature specification specifies a "block" of the embedding models for the categorical feature, e.g., the block 300 as illustrated in FIG. 3. The embedding models may be indexed by coordinate pairs (i,j), and the categorical feature specification may specify the block 300 by specifying the index (4,3) of the embedding model 302 at the bottom-right corner of the block 300. In the example illustrated by FIG. 3, by specifying the block 300, the categorical feature specification specifies embeddings of dimensionality 196 (=64+64+64) for the feature values corresponding to the first 4 million rows of the array. The categorical feature specification also specifies that the feature values corresponding to the last 1 million rows of the array are not in the vocabulary for the categorical feature. It can be appreciated that in the example illustrated with reference to FIG. 3, each feature value in the vocabulary for the categorical feature has the same dimensionality.

Figure 4:
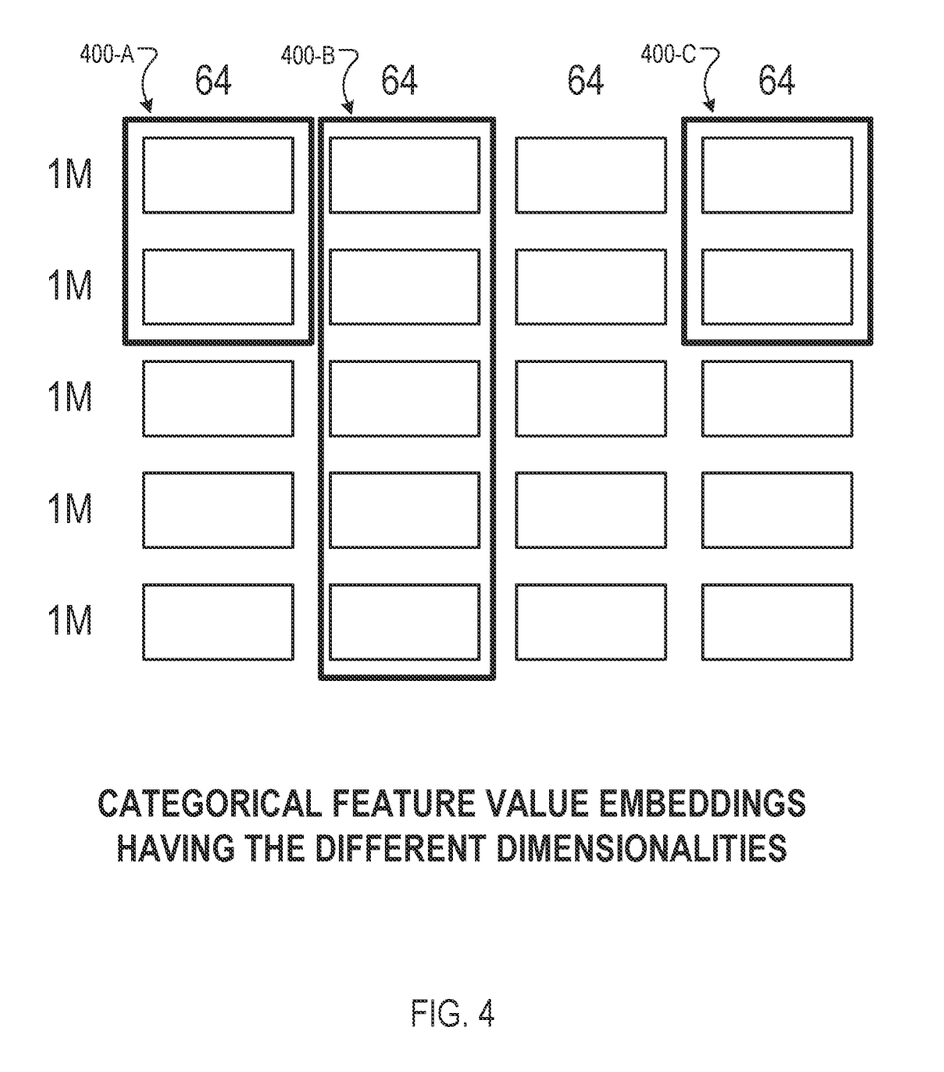
FIG. 4 shows a set of embedding models for a categorical feature that define embeddings having different dimensionalities for the active feature values of the categorical feature.

In some implementations, for each categorical feature, the categorical feature specification specifies a set of embedding models by specifying a respective block of embedding models in each "column" of embedding models, e.g., the blocks 400-A-C as illustrated in FIG. 4 (where no embedding models are specified in the third column). The categorical feature specification may specify a set of embedding models by a sequence of non-negative integer numerical values, where each numerical value specifies the number of embedding models in a block in a corresponding column of embedding models. For example, a categorical feature specification may specify the set of embedding models defined by the blocks 400-A-C by the sequence: (2,5,0,2), i.e., indicating two embedding models in the first column, 5 embedding models in the second column, 0 embedding models in the third column, and 2 embedding models in the fourth column. In the example illustrated by FIG. 4, the categorical feature specification specifies embeddings of dimensionality 196 (=64+64+64) for the feature values corresponding to the first 2 million rows in the array, and specifies embeddings of dimensionality 64 for the feature values corresponding to the last 3 million rows in the array. It can be appreciated that in the example illustrated by FIG. 4, different feature values of the categorical feature may have embeddings of different dimensionalities.

In some cases, the embedding of a feature value may be collectively defined by a set of sub-embeddings having different dimensionalities. In this case, the embedding system may use projection matrices to project each sub-embedding to the same dimensionality, and then combine (e.g., sum or average) the projected sub-embeddings to generate the overall embedding of the feature value. The parameters of the projection matrices may be trainable parameters of the embedding system.

Figure 5:
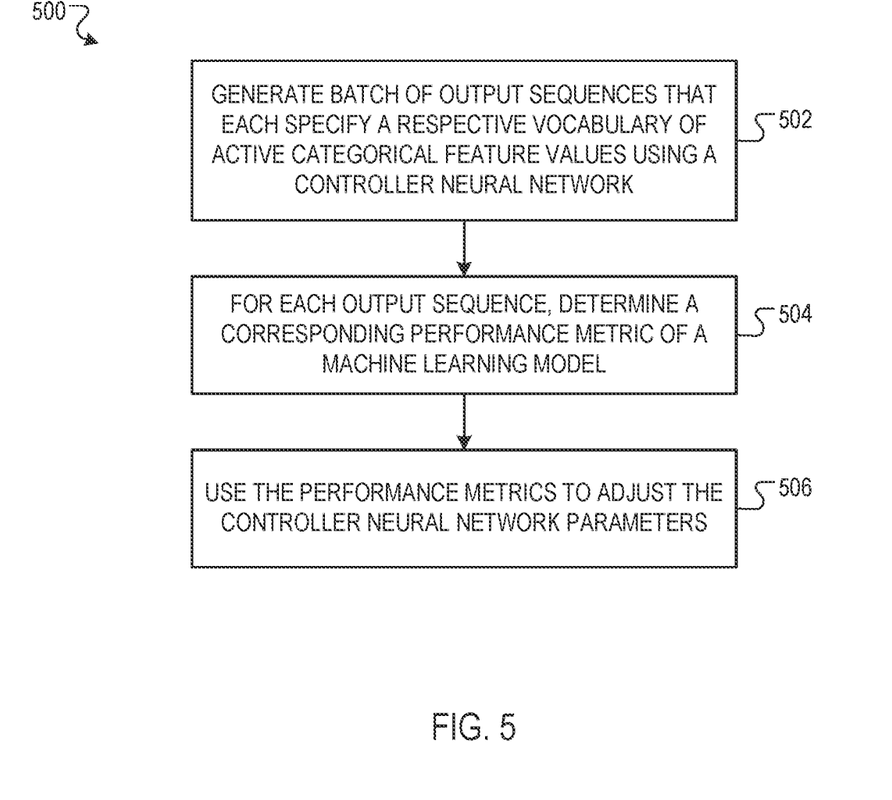
FIG. 5 is a flow diagram of an example process for determining, for each of one or more categorical features, a respective vocabulary of categorical feature values of the categorical feature that should be active during processing of inputs by a machine learning model.

FIG. 5 is a flow diagram of an example process 500 for determining, for each of one or more categorical features, a respective vocabulary of categorical feature values of the categorical feature that should be active during processing of inputs by a machine learning model. For convenience, the process 500 will be described as being performed by a system of one or more computers located in one or more locations. For example, a training system, e.g., the training system 100 of FIG. 1, appropriately programmed in accordance with this specification, can perform the process 500.

The system generates, using a controller neural network and in accordance with current values of the controller parameters, a batch of output sequences (502). Each output sequence in the batch specifies, for each of the categorical features, a respective vocabulary of categorical feature values of the categorical feature that: (i) should be active during processing of inputs by the machine learning model, and (ii) is a subset of a discrete set of possible categorical feature values of the categorical feature.

For each output sequence in the batch, the system determines a performance metric of the machine learning model on a machine learning task after the machine learning model has been trained with only the respective vocabulary of categorical feature values of each categorical feature specified by the output sequence being active (504). During the training, the machine learning model is configured to process an input that includes one or more possible categorical feature values of respective categorical features by, for only those possible categorical feature values included in the input that are specified as active by the output sequence, mapping the possible categorical feature value to a corresponding embedding that is iteratively adjusted during the training. The machine learning model then processes the embeddings to generate a machine learning model output for the input.

The system uses the performance metrics for the output sequences in the batch to adjust the current values of the controller parameters of the controller neural network (506).

Figure 6:
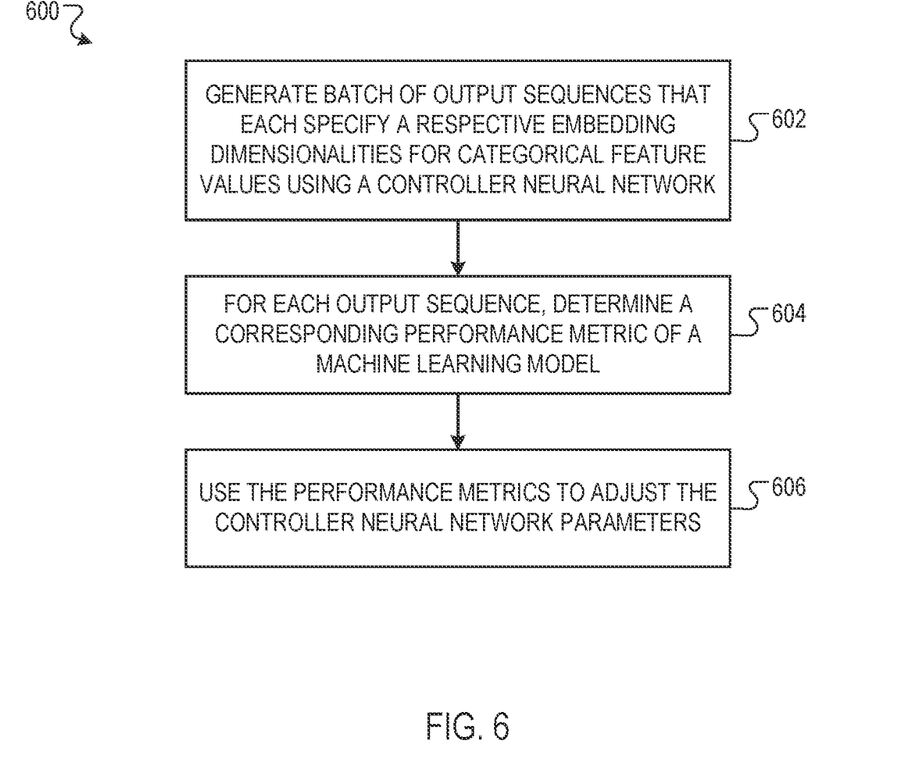
FIG. 6 is a flow diagram of an example process for determining, for each of one or more categorical feature values, a respective embedding dimensionality of an embedding that should be generated for the categorical feature value during processing of inputs by a machine learning model.

FIG. 6 is a flow diagram of an example process 600 for determining, for each of one or more categorical feature values, a respective embedding dimensionality of an embedding that should be generated for the categorical feature value during processing of inputs by a machine learning model. For convenience, the process 600 will be described as being performed by a system of one or more computers located in one or more locations. For example, a training system, e.g., the training system 100 of FIG. 1, appropriately programmed in accordance with this specification, can perform the process 600.

The system generates, using a controller neural network and in accordance with current values of the controller parameters, a batch of output sequences (604). Each output sequence in the batch specifies, for each categorical feature value, a respective embedding dimensionality of an embedding that should be generated for the categorical feature value during processing of inputs by the machine learning model.

For each output sequence in the batch, the system determines a performance metric of the machine learning model on a machine learning task after the machine learning model has been trained to perform the machine learning task when the machine learning model generates embeddings of the categorical feature values with the embedding dimensionalities specified by the output sequence (604). During the training, the machine learning model is configured to process an input that includes one or more categorical feature values by mapping each categorical feature value included in the input to an embedding having the corresponding embedding dimensionality specified by the output sequence. The machine learning model then processes the embeddings to generate a machine learning model output for the input.

The system uses the performance metrics for the output sequences in the batch to adjust the current values of the controller parameters of the controller neural network (606).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus for determining, for each of one or more categorical feature values, a respective embedding dimensionality of an embedding that should be generated for the categorical feature value during processing of inputs by a machine learning model having a plurality of machine learning model parameters, the method comprising:
generating, using a controller neural network having a plurality of controller parameters and in accordance with current values of the controller parameters, a batch of output sequences, each output sequence in the batch specifying, for each categorical feature value, a respective embedding dimensionality of an embedding that should be generated for the categorical feature value during processing of inputs by the machine learning model;
for each output sequence in the batch, determining a performance metric of the machine learning model on a machine learning task when the machine learning model generates embeddings of the categorical feature values with the embedding dimensionalities specified by the output sequence, wherein:
the machine learning model is configured to process an input that comprises one or more categorical feature values by performing operations comprising:
mapping each categorical feature value included in the input to an embedding having the corresponding embedding dimensionality specified by the output sequence; and
processing the embeddings to generate a machine learning model output for the input; and
using the performance metrics for the output sequences in the batch to adjust the current values of the controller parameters of the controller neural network.

2. The method of claim 1, wherein each output sequence specifies different embedding dimensionalities for different categorical feature values of a given categorical feature.

3. The method of claim 1, wherein:
the machine learning model comprises a respective plurality of embedding models corresponding to each categorical feature;
an embedding model corresponding to a categorical feature defines a mapping of each of one or more categorical feature values of the categorical feature to a corresponding sub-embedding of the categorical feature value having a respective dimensionality;
each output sequence in the batch specifies, for each of the categorical features, one or more embedding models corresponding to the categorical feature; and
mapping a given categorical feature value of a given categorical feature included in the input to an embedding comprises:
for each embedding model specified by the output sequence for the given categorical feature that defines a mapping of the given categorical feature value to a corresponding sub-embedding, using the embedding model to map the given categorical feature value to the corresponding sub-embedding; and
determining the embedding of the given categorical feature value based on the sub-embeddings.

4. The method of claim 3, wherein determining the embedding of the given categorical feature value based on the sub-embeddings comprises:
for any sub-embedding that has a dimensionality different than a specified dimensionality, projecting the sub-embedding to the specified dimensionality.

5. The method of claim 4, wherein determining the embedding of the given categorical feature value based on the sub-embeddings further comprises summing or averaging the sub-embeddings.

6. The method of claim 1, wherein processing the embeddings to generate a machine learning model output for the input comprises:
for each categorical feature, generating a combined embedding corresponding to the categorical feature based on the respective embedding of each categorical feature value of the categorical feature that is included in the input; and
processing the combined embeddings using one or more neural network layers to generate the machine learning model output for the input.

7. The method of claim 1, further comprising:
generating, using the controller neural network and in accordance with the adjusted values of the controller parameters, a new output sequence; and
training the machine learning model with the machine learning model being configured to generate embeddings of categorical feature values with embedding dimensionalities specified by the new output sequence to determine adjusted values of the machine learning model parameters.

8. The method of claim 1, wherein using the performance metrics for the output sequences in the batch to adjust the current values of the controller parameters of the controller neural network comprises:
training the controller neural network to generate output sequences that have increased performance metrics using a reinforcement learning technique.

9. The method of claim 8, wherein the reinforcement learning technique is an actor critic reinforcement learning technique.

10. The method of claim 1, wherein the performance metric for a given output sequence in the batch is based on a prediction accuracy of the machine learning model on the machine learning task when the machine learning model is configured to generate embeddings of categorical feature values with embedding dimensionalities specified by the given output sequence.

11. The method of claim 1, wherein the performance metric for a given output sequence in the batch is based on the respective embedding dimensionality corresponding to each categorical feature value.

12. The method of claim 1, wherein the controller neural network is a recurrent neural network that is configured to, for a given output sequence and at each of a plurality of time steps:
receive as input an representation of an output generated at a preceding time step in the given output sequence, and to process the input to update a current hidden state of the recurrent neural network and to generate a score distribution over possible outputs for the time step.

13. The method of claim 1, further comprising:
generating, in accordance with the adjusted values of the controller parameters, a final output sequence that indicates, for each categorical feature value, a respective embedding dimensionality of the embedding that should be generated for the categorical feature value during processing of inputs by the machine learning model.

14. The method of claim 13, further comprising:
performing the machine learning task for received inputs by processing the received inputs using the machine learning model when the machine learning model is configured to generate a respective embedding for each categorical feature value that has the dimensionality specified by the final output sequence.

15. The method of claim 1, wherein the machine learning model is configured to process an input that characterizes previous search queries of a user to generate an output that characterizes a predicted next search query of the user.

16. The method of claim 1, wherein the machine learning model is configured to process an input that characterizes previous videos watched by a user to generate an output that characterizes a predicted next video watched by the user.

17. The method of claim 1, wherein:
each output sequence in the batch additionally specifies an architecture of the machine learning model; and
for each output sequence in the batch, the machine learning model is configured to process the input using the machine learning model architecture specified by the output sequence.

18. The method of claim 1, wherein:
each output sequence in the batch additionally specifies, for each of one or more categorical features, a respective subset of categorical feature values of the categorical feature that should be active during processing of inputs by the machine learning model.

19. A system comprising:
one or more computers; and
one or more storage devices communicatively coupled to the one or more computers, wherein the one or more storage devices store instructions that, when executed by the one or more computers, cause the one or more computers to perform operations for determining, for each of one or more categorical feature values, a respective embedding dimensionality of an embedding that should be generated for the categorical feature value during processing of inputs by a machine learning model having a plurality of machine learning model parameters, the operations comprising:
generating, using a controller neural network having a plurality of controller parameters and in accordance with current values of the controller parameters, a batch of output sequences, each output sequence in the batch specifying, for each categorical feature value, a respective embedding dimensionality of an embedding that should be generated for the categorical feature value during processing of inputs by the machine learning model;
for each output sequence in the batch, determining a performance metric of the machine learning model on a machine learning task when the machine learning model generates embeddings of the categorical feature values with the embedding dimensionalities specified by the output sequence, wherein:
the machine learning model is configured to process an input that comprises one or more categorical feature values by performing operations comprising:
mapping each categorical feature value included in the input to an embedding having the corresponding embedding dimensionality specified by the output sequence; and
processing the embeddings to generate a machine learning model output for the input; and
using the performance metrics for the output sequences in the batch to adjust the current values of the controller parameters of the controller neural network.

20. One or more non-transitory computer storage media storing instructions that when executed by one or more computers cause the one or more computers to perform operations for determining, for each of one or more categorical feature values, a respective embedding dimensionality of an embedding that should be generated for the categorical feature value during processing of inputs by a machine learning model having a plurality of machine learning model parameters, the operations comprising:
generating, using a controller neural network having a plurality of controller parameters and in accordance with current values of the controller parameters, a batch of output sequences, each output sequence in the batch specifying, for each categorical feature value, a respective embedding dimensionality of an embedding that should be generated for the categorical feature value during processing of inputs by the machine learning model;
for each output sequence in the batch, determining a performance metric of the machine learning model on a machine learning task when the machine learning model generates embeddings of the categorical feature values with the embedding dimensionalities specified by the output sequence, wherein:
the machine learning model is configured to process an input that comprises one or more categorical feature values by performing operations comprising:
mapping each categorical feature value included in the input to an embedding having the corresponding embedding dimensionality specified by the output sequence; and
processing the embeddings to generate a machine learning model output for the input; and using the performance metrics for the output sequences in the batch to adjust the current values of the controller parameters of the controller neural network.

* * * * *